(12) United States Patent
Bussler et al.

(10) Patent No.: US 7,865,480 B2
(45) Date of Patent: Jan. 4, 2011

(54) SYSTEMS AND METHODS FOR VALIDATING OBJECTS MODELS

(75) Inventors: Christoph Bussler, Galway (IE); Janaki Krishnawamy, Redwood Shores, CA (US); Michael James Chiocca, Mountain View, CA (US); Vladimir Svetov, Foster City, CA (US); Alexander Denissov, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1153 days.

(21) Appl. No.: 10/731,805

(22) Filed: Dec. 8, 2003

(65) Prior Publication Data

US 2005/0125806 A1      Jun. 9, 2005

(51) Int. Cl.
 *G06F 17/30* (2006.01)
(52) U.S. Cl. ...................... 707/694; 707/703; 707/756; 707/802
(58) Field of Classification Search .................. 707/100
 See application file for complete search history.

(56) References Cited

U.S. PATENT DOCUMENTS

| | | | | |
|---|---|---|---|---|
| 6,681,383 | B1* | 1/2004 | Pastor et al. | 717/126 |
| 6,968,500 | B2* | 11/2005 | Mikhailov et al. | 715/505 |
| 7,185,016 | B1* | 2/2007 | Rasmussen | 707/100 |
| 2003/0028540 | A1* | 2/2003 | Lindberg et al. | 707/100 |
| 2003/0070142 | A1* | 4/2003 | Drake et al. | 715/513 |
| 2005/0038764 | A1* | 2/2005 | Minsky et al. | 706/47 |

OTHER PUBLICATIONS

Sang-Kyun Kim, et al., "Immediate and Partial Validation Mechanism for the Conflict Resolution of Update Operations in XML Databases," X. Meng, et al. (Eds.): WAIM 2002, LNCS 2419, pp. 387-396, 2002, copyright Springer-Verlag Berlin Heidelberg 2002.*
Balsters, Herman, et al., "Typed Sets as a Basis for Object-Oriented Database Schemas," 1993, Springer-Verlag, ECOOP '93, pp. 161-184.*
Dallianis, Hercules, "A method for validating a conceptual model by natural language discourse generation," 1992, SpringerLink, Advanced Information Systems Engineering: Lecture Notes in Computer Science, vol. 593, pp. 425-444.*
Cheng, Heyningl, "Knowledgescapes: A probabilistic model for mining tactic knowlege for information retrieval," 2001, University of California, Berkley, pp. 1-25.*

\* cited by examiner

*Primary Examiner*—Neveen Abel Jalil
*Assistant Examiner*—Farhan M Syed
(74) *Attorney, Agent, or Firm*—Townsend and Townsend and Crew LLP

(57) ABSTRACT

A metadata validation process that allows for deferring object model validation until after the objects are created. The process also allows for multi-threaded processing of the validation rules, thus increasing overall performance. Validation is performed by enforcing a series of validation rules on an appropriate subject. Rules are specified according to the subject that they are validating (i.e., attribute level, association level, object level or collection level). The metadata driven validation process implements several validation types on different validation units. Correctness validation rule types ensure that a validation unit satisfies all semantic rules defined for it. Completeness validation rule types ensure that a validation unit contains all the necessary data and is ready for further use. At design time, only correctness type validation is performed. Thus, the present invention advantageously allows for incomplete objects to be created at design time. The developer, however, in this case may opt to perform completeness validation at any time. In general, a developer may opt to perform completeness and/or correctness validation at any time independent of deployment processing. In another aspect, full validation (e.g., completeness and correctness) is automatically performed on the objects during the process of creating a configuration prior to deployment.

25 Claims, 3 Drawing Sheets

SYSTEMS AND METHODS FOR VALIDATING OBJECTS MODELS

BACKGROUND OF THE INVENTION

The present invention relates generally to object-oriented programming and object models, and more particularly to validation of object models.

Object-oriented software is typically built on top of an object model. The object model provides a definition of entities in the system and their associations to each other. Unified Modeling Language (UML) is a modeling system that provides a means to specify, construct, document and visualize an object model. For example, UML diagrams are typically used to represent and document object models. The diagrams rendered in the display provide the user with a visual feedback that allows the user to simply and easily understand the model paradigm being created or implemented. However, UML is not powerful enough to define complex validation rules and constraints that fully describe a consistent object model.

Traditionally validation of objects is achieved by incorporating the validation logic into the programming logic responsible for maintaining the data in the system. Validation rules in this case are "hard-coded" into the APIs (Application Programming Interfaces) and it is usually not possible to alter the behavior of such logic once the APIs have been developed.

Another approach is to formalize the definition of constraints on the object model by using Object Constraint Language (OCL). With this approach, the defined constraints are meant to be always satisfied, thus not allowing incorrect and incomplete data to be created. While satisfying the goal of having consistent data in the system, this approach is very inflexible for the developers of application logic because the specific methodology must be followed to create objects that do not violate system constraints.

Thus, there is a need for new systems and methods for describing and enforcing validation rules for an object model. Such systems and methods should also allow for flexibility in designing objects and in determining when validation processes are invoked.

BRIEF SUMMARY OF THE INVENTION

The present invention provides systems and methods for describing and enforcing validation rules for an object model. Such systems and methods provide for much flexibility in the design of objects and in the invocation of validation processes.

According to the present invention, a validation process is provided that is applicable to any object model. The process is metadata driven, thus allowing for existing unit definitions and validation rules to be edited, and for new rules to be defined. The process allows for deferring object model validation until after the objects are created. The process also advantageously allows for the user to create incomplete objects in a design environment. For example, when the user is ready to define an agreement, he/she may not have all the information which is required for the participants in the agreement. The present invention advantageously allows the user to define the agreement with incomplete but correct information. In order for the agreement to be effective and for the partners to do business, however, the agreement has to be completely defined. Since it is not desirable to have runtime errors due to incomplete information, the present invention also advantageously provides for automatic validation upon deployment (and for the user to select validation at any time) to determine whether the objects that are to be deployed form a complete set and whether the semantics of objects in the set is indeed correct.

The process also allows for multi-threaded processing of the validation rules, thus increasing overall performance. According to one aspect, validation is performed by enforcing a series of validation rules on an appropriate subject. Rules are specified according to the subject that they are validating (i.e., attribute level, association level, object level or collection level). A metadata validation engine is used to execute these rules during the validation process.

According to one aspect of the present invention, a metadata driven validation process implements several validation types on different validation units. In one aspect, two validation rule types are provided—correctness and completeness types. The correctness validation rule type ensures that a validation unit satisfies all semantic rules defined for it. The completeness validation rule type ensures that a validation unit contains all the necessary data and is ready for further use. In one aspect, at design time, only correctness type validation is performed. Thus, the present invention advantageously allows for incomplete objects to be created at design time. The developer, however, in this case may opt to perform completeness validation at any time. In general, a developer may opt to perform completeness and/or correctness validation at any time independent of deployment processing. In another aspect, full validation (e.g., completeness and correctness) is automatically performed on the objects prior to deployment processing.

In one aspect, the validation process for an object model is based on "divide-and-conquer" principle; the model is divided into several levels of validation units. Each unit is validated independently by the validation process. The complete object model is valid if all of the validation units defined for it are valid individually. In one aspect, the highest level of validation unit is a collection of objects. The set of objects which compose a collection is computed, in one aspect, by a separate metadata driven process. This 'separate process' in one aspect is a combination of the execution of queries described later as well as an independent algorithm that traverses an object model from a given root object to produce what is referred to as a "transitive closure". A collection forms a complete and well formed set of objects. A collection may also be composed of other collections. The next level of validation unit is a single, individual object. Further levels are defined for the attributes and associations of an individual object.

The validation process defines a sequence of operations necessary to establish the validity of a given validation unit. The process uses metadata created by a model developer to inquire on the different validation units in the model and the rules to be applied to them. Composite units are validated for a specified type. All members of composite units are also validated for the same type.

According to an aspect of the present invention, a computer-implemented method is provided for validating metadata in an object model stored in a database. The method typically includes identifying a first subject of validation, wherein the first subject is one of an object, an attribute, an association and a collection of objects, and determining a context of metadata validation based on the first subject, the context including one of a) the first subject, and b) the first subject and one or more additional subjects. The method also typically includes determining one or more validation rules for each subject in the context, and applying the determined validation rules to each subject in the context.

According to another aspect of the present invention, a metadata validation system is provided for validating an object model. The system typically includes a database that stores the objects and metadata of the object model, a means for identifying a first subject of validation, wherein the first subject type is one of an object, an attribute, an association and a collection of objects, and a means for determining a context of metadata validation based on the first subject, the context including one of a) the first subject, and b) the first subject and one or more additional subjects. The system also typically includes a means for determining one or more validation rules for each subject in the context, and a means for applying the determined validation rules to each subject in the context.

According to yet another aspect of the present invention, a method is provided for validating metadata in an object model in a database. The method typically includes receiving user defined rules, each rule defining a validation rule on a meta metadata object, each rule being one of a completeness type rule and a correctness type rule, storing the validation rules to the database, and identifying a first subject of metadata validation, wherein the first subject has a subject type selected from the group consisting of an attribute, an association, an object and a collection of objects. The method also typically includes determining a context of validation based on the first subject, wherein the context includes the first subject and none, one or more additional subjects, determining one or more validation rules for each subject in the context based on the subject type of each subject, and applying the validation rules to each of the determined subjects.

In certain aspects, each subject is a meta metadata object selected from the group consisting of a MetaAttribute, a MetaAssociation, a MetaAssociationEnd, a MetaClass and a MetaCollection.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

Figure 1:
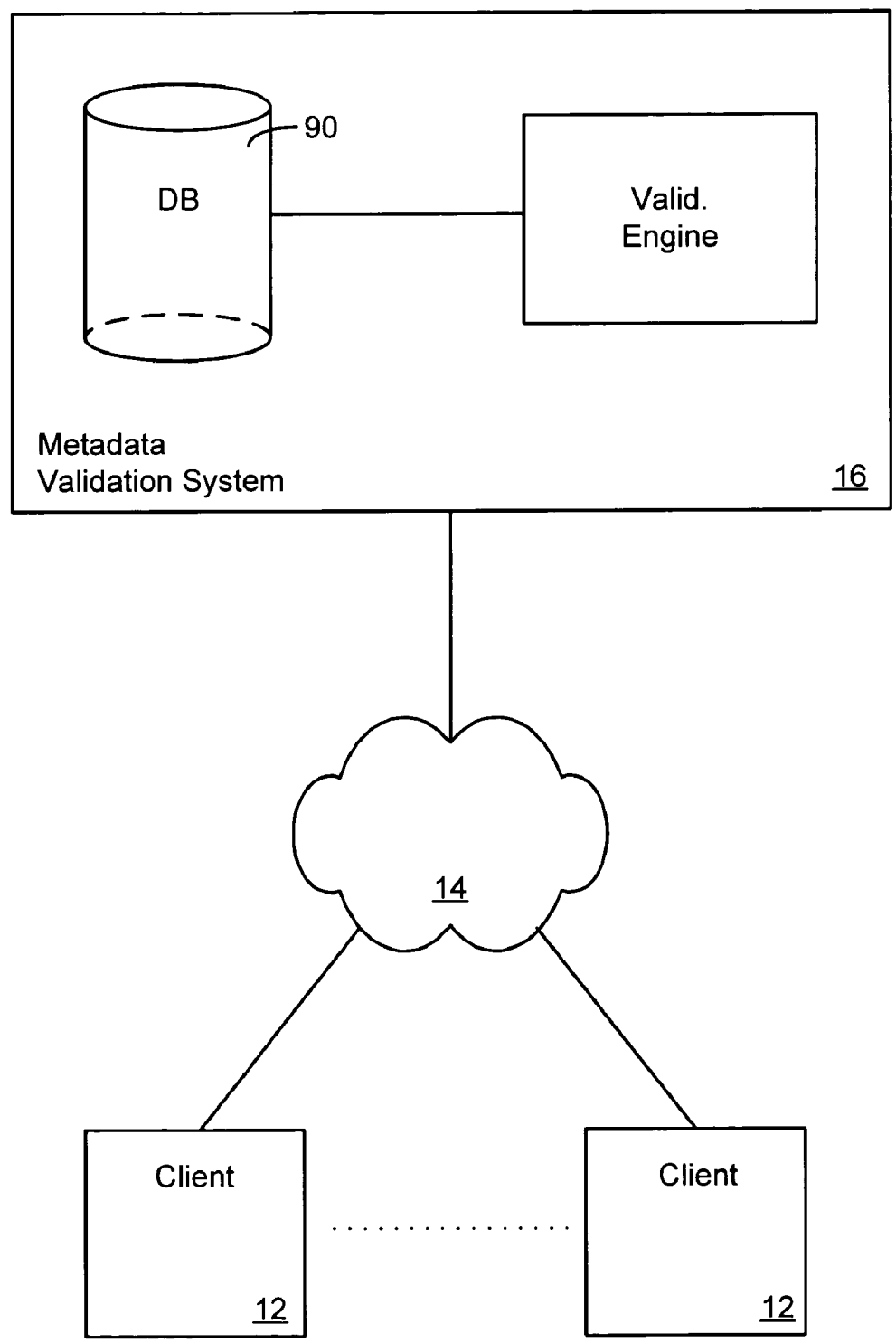
FIG. 1 illustrates an environment wherein a metadata validation system framework might be used.

According to the present invention, systems and methods are provided for implementing metadata validation. Metadata validation is the validation of metadata in a data repository, such as a database. A metadata validation framework provides a means for performing metadata validation on a given subject within a specified context.

General Definitions and Concepts

The subject of metadata validation is the meta metadata object on which a validation rule is defined. In general, the following terms are used herein to describe meta metadata objects: MetaClass, MetaCollection, MetaAttribute, MetaAssociation, MetaAssociationEnd. A MetaClass is an object used to represent a model class. A MetaCollection is a concept used to represent a collection of MetaClass objects. A MetaAttribute is an object used to represent a single attribute of a MetaClass object. A MetaAssociation is an object used to represent an association between two MetaClass objects. A MetaAssociationEnd is an object used to represent one end of a MetaAssociation object. A Subject Type class object is used to represent a MetaAttribute, a MetaAssociation, a MetaAssociationEnd, a MetaClass, and a MetaCollection.

For example, if a validation rule enforces that all business process names start with 'BP', then the rule is on the MetaAttribute for attribute 'name' in class BusinessProcess. The following are the various types of subjects for whom validation rules are applied in one aspect:

Attribute—A validation rule that is defined on the meta definition for an attribute, MetaAttribute (e.g., the 'name' of a BusinessProcess must always start with the letters 'BP'). The validation framework invokes an attribute rule only when the attribute is set for a given object.

Association—A validation rule that is defined on the meta definition for an association, MetaAssociation (e.g., there can be only one ContactInfo associated with a ContactType). The validation framework invokes an association rule only when the association is set.

AssociationEnd—A validation rule that is defined on a MetaAssociationEnd. The validation framework invokes a rule defined on a MetaAssociationEnd when an object is first associated or when the associated object is modified.

Object—A validation rule that is defined on a metadata class, MetaClass. Such a rule validates a set of attributes within an object. The validation framework invokes an object rule when an instance of the MetaClass (i.e., an object) is first created or is updated. An object level rule can also involve the validation of associations between the subject object and other objects through those associations. Such a rule can also perform a validation based on a combination of attributes and associations as well.

Collection—A validation rule that is defined on a collection of metadata classes, MetaClasses (e.g., apply validation rules to a native role and an agreement of choice that uses that native role as opposed to all agreements that use that native role). The validation framework invokes rules when instances of objects of these MetaClasses are to be validated as a collection.

The Collection subject type is further subdivided into two different categories:

1. A Deployable Collection is a Collection with a root object whose relationships are strictly included. This type of Collection represents a tree of objects that form a true transitive closure starting at the root object and proceeding down its associations so that all objects associated with that root object are included transitively (e.g., using a predefined set of queries and a process that traverses the associations among the various objects).

2. An Aggregated Collection is a Collection with a root object and its child objects. The Aggregated Collection includes the root object and only those objects that are strongly aggregated with that root object recursively.

The context of metadata validation represents the instances of object(s) which are provided to the validation framework at the time of metadata validation for whom validation rules are to be applied.

Table 1 describes the semantics of the different levels of validations according to one embodiment. The classification of these levels is based on the subject of validation and its context.

TABLE 1

| Level of Validation | Subject of Validation | Context of Validation |
|---|---|---|
| Attribute | MetaAttribute | Instance of the Object containing the Attribute |
| Association | MetaAssociation | Instance(s) of the Object(s) on one or both ends of the Association |
| Object | MetaClass | Instance of the Object |
| Collection | MetaCollection | Root object instance and instances of all objects in the collection |

Association level validations are performed in one aspect by having the subject of validation be MetaAssociationEnd. The validation context is the object instances at both MetaAssociationEnds of the corresponding MetaAssociation. Implementing association level rules in this manner advantageously avoids impacting the data repository to support pure association level rules. A single rule on an association is implemented by applying two rules, one to each object at both ends of the association. Such rules are invoked when the objects are first associated or when they are modified.

According to one embodiment, two types of validation rules are provided: correctness and completeness rule types. Correctness type rules determine whether the subject of metadata validation is correct (e.g., the first character in a string is an alphanumeric character, or a special string field has only a specified number of characters). Completeness type rules determine whether the subject of metadata validation is complete (i.e., the subject is ready to be deployed). In one aspect, completeness is determined only for an object or for a collection of objects. Thus, in this aspect, validation rules for attributes and associations are correctness rules whereas validation rules for objects or collections might be either classified as correctness or completeness or both. Tables 2 and 3 show examples of validation performed for various levels of validation for correctness and completeness rules according to one embodiment. In another aspect, completeness rules are defined at the attribute and association levels. An example of an attribute level completeness rule is whether an attribute of an object is defined (i.e., has a non-null value). An example of an association level completeness rule would be that an association between two objects must exist.

TABLE 2

| | Correctness Validation |
|---|---|
| Level of Validation | Validation Performed |
| Attribute | Type validation. |
| Association | Type validation. |
| Object | Semantic validity of the object. All attribute values form a consistent set. |
| Collection | Semantic validity of root object. |

TABLE 3

| | Completeness Validation |
|---|---|
| Level of Validation | Validation Performed |
| Object | Deployment readiness of the object and all objects strongly aggregated to it recursively. |
| Collection | Deployment readiness of the transitive closure of the root object. |

According to one embodiment, invocation of validation rules is based on the type of validation rule. Correctness validation is performed implicitly by the UT when objects are first created or are updated at design time. This ensures that the design time metadata is correct. Correctness and completeness validation are performed implicitly during the process of creating a configuration to determine if objects at design time are ready to be deployed. Correctness and completeness validation may also be performed explicitly by the user using the UI. Tables 4 and 5 illustrate invocation of validation rules from a user point of view.

TABLE 4

| | Correctness |
|---|---|
| Level of Validation | Performed When and By Whom |
| Attribute | Implicitly by the UI when the attribute is set |
| Association | Implicitly by the UI when the association is set |
| Object | Implicitly by the UI when the object is either created or updated |
| Collection | Explicitly by the user |

TABLE 5

| | Completeness |
|---|---|
| Level of Validation | Performed When and By Whom |
| Object | Explicitly by the user or implicitly by the UI |
| Collection | Implicitly during the creation of a configuration |

In one embodiment, Metadata is classified into two categories: modeling metadata and profile metadata. Modeling metadata include type definitions for process modeling, e.g., business process modeling. Profile metadata includes the metadata related to entities such as, for example, Agreements, Applications and TradingPartners.

A configuration is a collection of modeling and profile metadata that is consistent and complete (as determined by metadata validation) and which can be deployed. A configuration represents all of the objects (e.g., a business process) that are required to be deployed for that configuration to run. Hereafter, this shall also be referred to as a deployment unit. That is, a configuration is a verified and complete deployable unit (e.g., business process) that contains all of the metadata necessary for that configuration to execute at runtime. Configurations are typically created at design time, when a user decides to model a process (e.g., business process) that needs to be deployed, and can be validated by the metadata validation process prior to deployment.

Deployment is a process that takes a validated configuration from a design time context to a runtime context, e.g., by transferring the design time configuration metadata to a runtime context for execution, in one embodiment.

System Framework Architecture

FIG. 1 illustrates an environment wherein a metadata validation system framework might be used. As illustrated in FIG. 1 any user systems 12 might interact via a network 14 with a metadata validation system 16. The users of those user systems 12 might be users in differing capacities and the capacity of a particular user system 12 might be entirely determined by the current user. For example, where a developer is using a particular user system 12 to interact with metadata validation system 16, that user system has the capacities allotted to that developer. However, while an administrator is using that user system to interact with metadata validation system 16, it has the capacities allotted to that administrator.

Network 14 can be a LAN (local area network), WAN (wide area network), wireless network, point-to-point network, star network, token ring network, hub network, or other configuration. One of the most common type of network in current use is a TCP/IP (Transfer Control Protocol and Internet Protocol) network such as the global internetwork of networks often referred to as the "Internet" with a capital "I". For example, user systems 12 might communicate with system 16 using TCP/IP and, at a higher network level, use other common Internet protocols to communicate, such as HTTP, FTP, AFS, WAP, etc.

Figure 2:
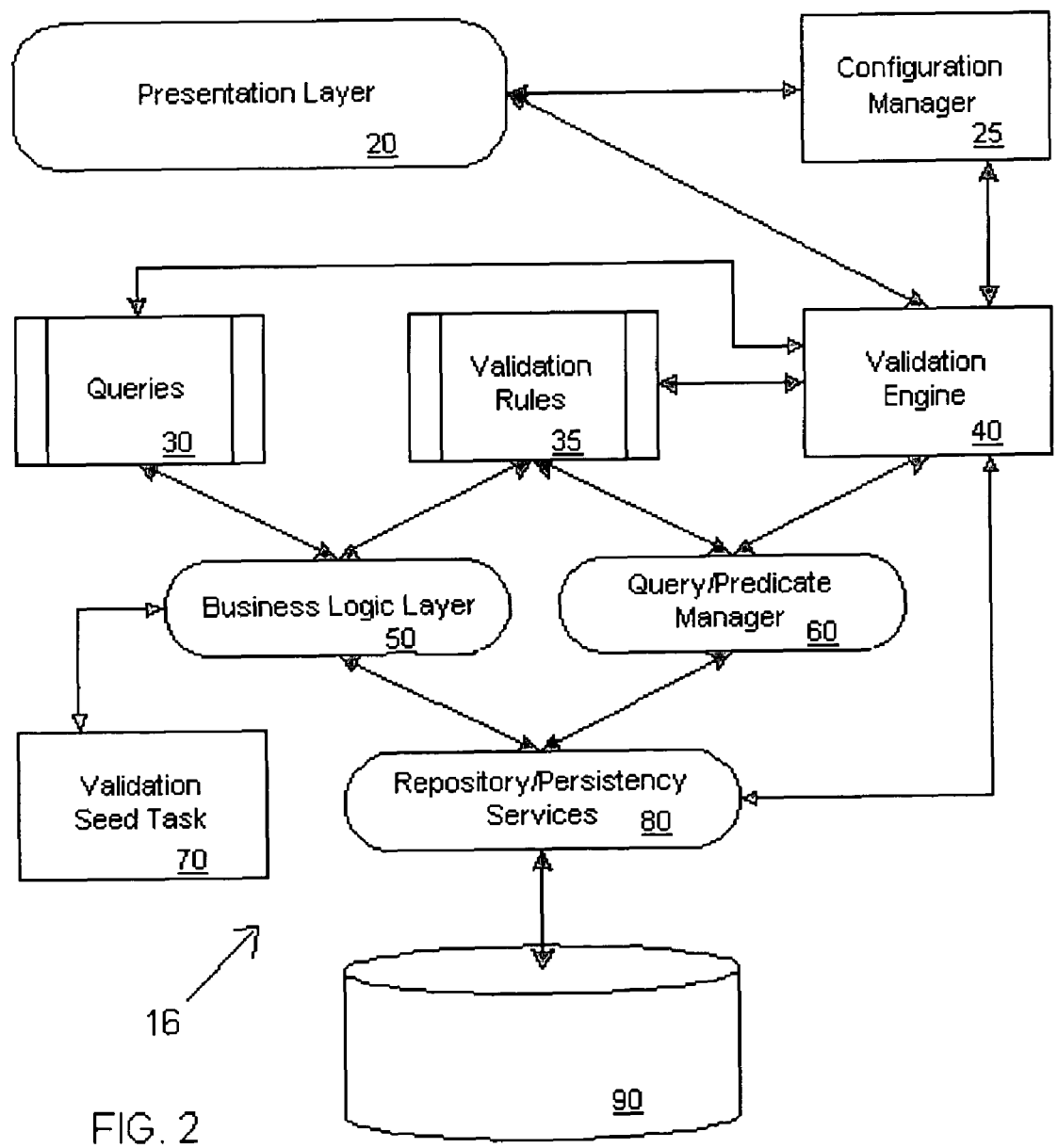
FIG. 2 illustrates a metadata validation system architecture according to one embodiment of the present invention.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs a client interface module, such as an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., object model developer) of user system 12 to access, process and view information and pages available to it from system 16 over network 14. Each user system 12 also typically includes one or more user interface devices, such as a keyboard, a mouse, touch screen, pen or the like, for interacting with a graphical user interface (GUI) provided on a display (e.g., monitor screen, LCD display, etc.) in conjunction with pages, forms and other information provided by system 16 or other systems or servers. The client interface module of system 12 typically implements or interfaces with a presentation layer 20 (FIG. 2). As discussed above, the present invention is suitable for use with any type of network such as the Internet, an intranet, an extranet, a virtual private network (VPN), a non-TCP/IP based network, any LAN or WAN or the like.

According to one embodiment, each user system 12 and all of its components are operator configurable using applications, including computer code run using a central processing unit such as an Intel Pentium processor or the like. Similarly, system 16 and all of their components might be operator configurable using application(s) including computer code run using a central processing unit such as an Intel Pentium processor or the like, or multiple processor units. Computer code for operating and configuring system 16 to intercommunicate and to process tables, pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, or any other scripting language, such as VBScript. It is appreciated that the code for implementing the metadata validation processes of the present invention may also be stored and executed on a standalone system, with no network connection.

According to one embodiment, metadata validation system 16 includes a database system 90 for storing objects and data according to various object schema. If more than one database system is used, they may be located in close proximity to one another (e.g., in a server farm located in a single building or campus), or they may be distributed at locations remote from one another (e.g., one or more servers located in city A and one or more servers located in city B). The metadata validation system 16, in one aspect, could be implemented in a standalone system with an associated data storage repository or database, or it could include one or more logically and/or physically connected servers distributed locally or across one or more geographic locations. Additionally, the term "server" is meant to include a computer system, including processing hardware and process space(s), and an associated database storage system and database application as is well known in the art. It should also be understood that "server system" and "server" may be used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

FIG. 2 illustrates a metadata validation framework system architecture 16 according to one embodiment of the present invention. As shown, system 16 includes various process modules and layers. Validation engine 40 provides the validation process framework for validating objects. Validation engine 40 provides a mechanism for executing queries, validation rules and other functions. The validation engine 40 is invoked from either a presentation layer 20 (i.e., the user interface (UI) layer—e.g., by a user identifying a subject of validation and selecting a validation button on client 12) or a configuration manager 25 through one of the validation engine's public APIs. Validation engine 40 invokes the necessary queries and rules from query module 30 and validation rule module 35 based on the subject of validation. The set of objects to be validated is computed as described herein (i.e., by execution of a predefined set of queries and a separate algorithm). A deployment manager module (not shown) manages and controls deployment processing.

Thus, in one aspect, a user, using a browser, interacts with a GUI (referred to as the presentation layer 20 in FIG. 2) to create design time metadata in a data repository (i.e., a database 90). The GUI interacts with the metadata validation system either implicitly or explicitly from a user's point of view. Implicitly, the GUI invokes metadata validation when objects are either first created or updated by a user. Explicitly, a user may use the GUI to invoke the metadata validation system in at least two ways. One way is by selecting, e.g., a 'Validate' button on a GUI screen. Another way is through the process of creating a configuration. The configuration manager 25 invokes the metadata validation system prior to creating a configuration. Again, this is done explicitly through the GUI. Once a valid configuration is created, the deployment manager is invoked to deploy the metadata into a runtime context.

Validation rules module 35 includes rules that define certain validation criteria that are to be applied to a validation subject. Validation queries module 30 includes logic which, when executed by validation engine 40, retrieves lists of objects, some being subjects for which validation rules may need to be evaluated. These queries are also used to retrieve sets of objects that, when combined, form transitive closures based on a given root object. A 'separate process' or algorithm is used in conjunction with these queries to compute the transitive closure (referred to as the deployment unit). The computation of the deployment unit is required not only by the validation engine 40, but also by the configuration manager 25.

The validation engine 40 is invoked by calling one of its APIs to validate either an individual object (e.g., the aggregated collection whose root object is the object specified) or to validate a deployable collection. Other APIs can be used to obtain sets of objects that form transitive closures based on a supplied root object (e.g., a deployable business process).

During validation, when validation engine 40 invokes a rule from rules module 35, the rule invokes use case APIs supplied by the business logic layer (BLL) 50 to access information about the subject of the rule and also to traverse associations starting from that subject to other related objects that are relevant to the evaluation of the rule. In some cases, a rule will use the query/predicate manager (QPM) module 60 to execute a query against the database 90 when evaluating a rule. The BLL 50 and QPM 60 extract the information from the database 90 through the repository/persistency services module 80.

In one aspect, validation queries, given a specified object, are used to produce a list of target objects associated with that specified object. All queries traverse the model's relevant associations starting from the specified object to a target object. In one aspect, validation rules and queries are implemented in Java according to a specific template. In this aspect, all Java rules and queries preferably have the same signature and pre and post processing. The actual implementation of the rule itself is written by a developer after the pre-processing and before the post-processing phases of the rule in the body of the rule function. In another aspect, queries are written using a simple meta-language (METALANG) that captures the specified target object itself and in some cases a single association to a target object.

The Validation Seed Task 70 is executed by a system seed driver during installation of the system and is a seeding task that stores all non-generated validation metadata in the data repository 90. This metadata defines subjects, rules, etc., and their associations. Some of the validation seed data are created and pre-seeded as part of the normal model generation process. In one aspect, only the MetaClasses, MetaAttributes, MetaAssociations, MetaAssociationEnds and their names, etc. are pre-seeded. In this aspect, none of the validation metadata that is required by the validation system is pre-seeded. This is done by the Validation Seed Task 70. The remaining seed data are created during the validation seeding task using use cases generated during a prior seed task. In general, the Validation Seed Task 70 uses the BLL 50 to create subjects and rules, etc. and to make the necessary associations between them so as to provide the necessary metadata for use by the validation engine 40. For example, in one aspect, the Validation Seed Task 70 creates SubjectTypes, ValidationRules and SubjectTypeMembers using the metadata that is pre-seeded during model generation and sets the various associations between these objects. This populates the repository 90 described by the schema shown in FIG. 3. During the validation process, validation engine 40 queries the validation and design time metadata to determine which queries need to be executed and which rules need to be evaluated for a given subject. The appropriate Java query and rule functions are executed by supplying that function's requisite parameters.

Validation Schema

Figure 3:
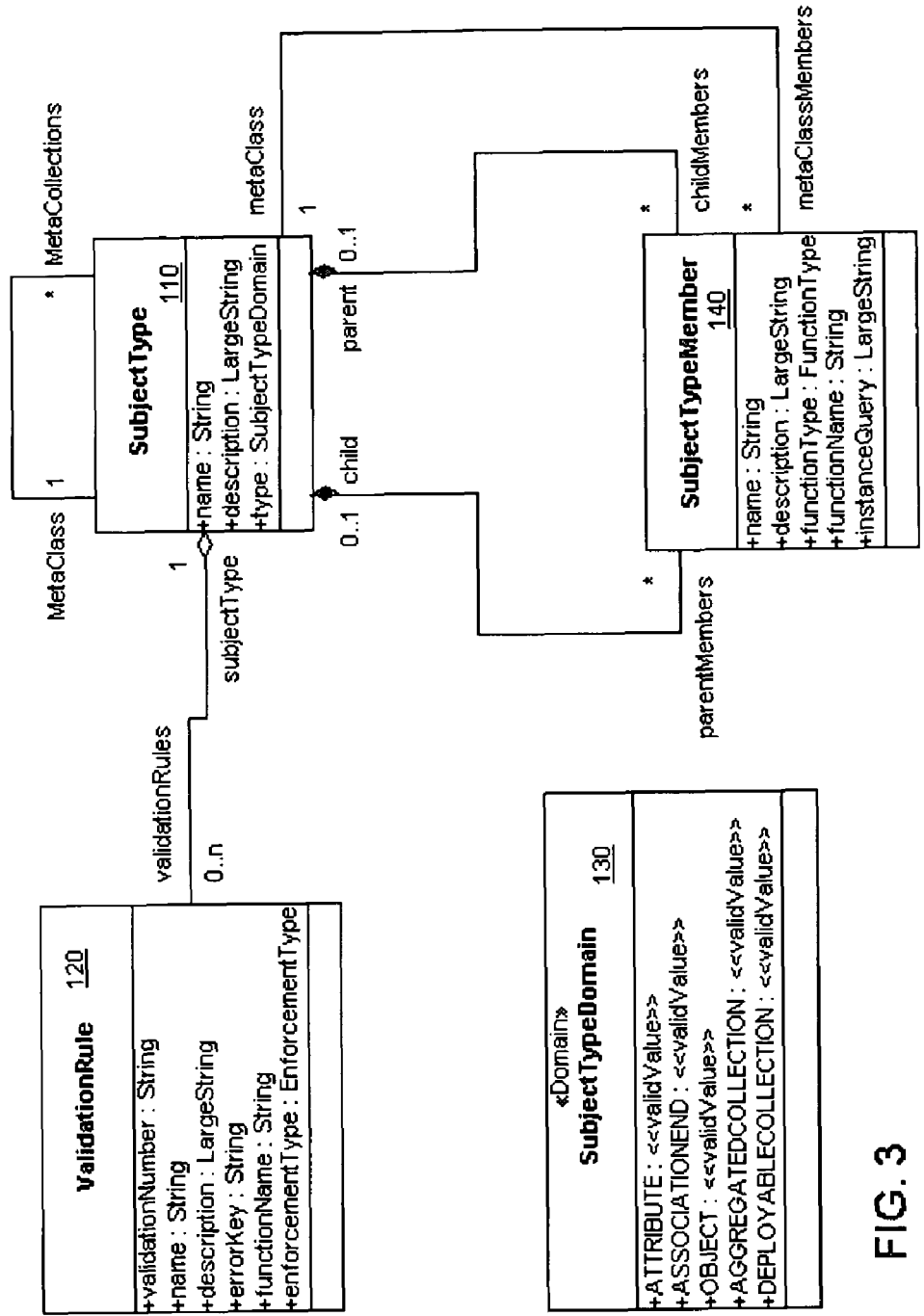
FIG. 3 illustrates a class diagram for the metadata validation schema according to one embodiment of the present invention.

FIG. 3 illustrates a logical view of a class diagram for the metadata validation framework schema according to one embodiment of the present invention. The validation schema captures all of the validation metadata, including all subjects, their validation rules and any member subjects that are associated with each individual subject. Generation based on this modeling schema provides the desired BLL APIs and use cases for creating and managing rules and subjects (e.g., create a subject, a validation rule and associate that rule with the subject).

As shown in FIG. 3, the SubjectType class 110 is used to represent a subject of validation. The SubjectType class 110 aggregates the ValidationRule class 120. For each subject there can exist multiple rules associated with that subject. Table 6 illustrates an example of a SubjectType class definition.

TABLE 6

| | | SubjectType | | |
|---|---|---|---|---|
| Attribute Name | Type | Not Null | Unique | Description |
| name | String(255) | Y | Y | The name of the subject |
| description | LargeString | | | User readable description of the subject |
| type | SubjectTypeDomain | Y | Y | The type of the subject |

The SubjectTypeDomain class 130 is a domain object whose valid values are used to determine the type of the subject. Table 7 illustrates an example of a SubjectTypeDomain class definition.

TABLE 7

| SubjectTypeDomain | |
|---|---|
| Valid Value | Description |
| ATTRIBUTE | The subject is an individual attribute of an instance of a MetaClass |
| ASSOCIATIONEND | The subject is one end of an association between two instances of MetaClass objects |
| OBJECT | The subject is an instance of a MetaClass |
| AGGREGATEDCOLLECTION | The subject is a root object instance and all object instances strongly aggregated to it |
| DEPLOYABLECOLLECTION | The subject is a root object instance and all objects associated with it transitively |

Note that the name of a subject depends on and is, in many cases, derived from the SubjectTypeDomain of that subject. Table 8 describes how to interpret the name of a subject according to one aspect.

TABLE 8

| Interpreting the Name of a Subject Type | |
|---|---|
| SubjectTypeDomain | Name of the Subject Type |
| ATTRIBUTE | <Name of the Subject's MetaClass>.<Name of the Attribute> |
| ASSOCIATIONEND | <Name of the Subject's MetaClass>.<Name of the AssociationEnd> |
| OBJECT | <Name of the Subject's MetaClass> |
| AGGREGATEDCOLLECTION | <Name of the First Class object's MetaClass> |
| DEPLOYABLECOLLECTION | MetaCollectionConstants.<Deployable MetaCollection Constant> |

So, for example, the name of the subject for a rule applied to the "name" attribute of a business process might read, "TIP_BusinessProcess.name". For DEPLOYABLECOLLECTION, the description mentions 'MetaCollectionConstants' which is a file that contains the names of all Deployable Collections. For example, in this file there is a constant called DEPLOYABLEBUSINESSPROCESS that has the String value of "DeployableBusinessProcess".

The ValidationRule class 120 is used to represent a validation rule in the system. The ValidationRule class 120 is aggregated by the SubjectType class 110 and only exists in the context of a validation subject. For a given validation rule, there can be only one subject. Table 9 illustrates an example of a ValidationRule class definition.

TABLE 9

| ValidationRule | | | | |
|---|---|---|---|---|
| Attribute Name | Type | Not Null | Unique | Description |
| validationNumber | String(100) | Y | Y | The number of the validation rule |
| name | String(255) | Y | | The name of the validation rule |
| description | LargeString | | | User readable description of the validation rule |
| errorKey | String(255) | Y | | The key of the entry in the resource bundle that contains the error message shown when the rule fails |
| functionName | String(255) | Y | | The name of the Java method that implements the rule's logic (PL/SQL may also be used) |
| enforcementType | EnforcementType | Y | | The type of enforcement (i.e. CORRECTNESS or COMPLETENESS) |

The SubjectTypeMember class 140 is used to represent membership in different ways, such as, for example, membership of a MetaClass in a MetaCollection and membership of a MetaCollection in another MetaCollection. For example, since a role can be composed of multiple steps, a "Step" MetaClass might be a member in a "Role" MetaCollection. As another example, since a business process can involve multiple roles, a "Role" MetaCollection might be a member in a "BusinessProcess" MetaCollection. Table 10 illustrates an example of a SubjectTypeMember class definition.

TABLE 10

SubjectTypeMember

| Attribute Name | Type | Not Null | Unique | Description |
|---|---|---|---|---|
| name | String(255) | Y | Y | The name of the subject type member |
| description | LargeString | | | User readable description of the subject type member |
| functionType | FunctionType | Y | | The type of the function that implements the query. The values are limited to those specified in the FunctionType domain object, e.g., JAVA and METALANG. |
| functionName | String(255) | | | For JAVA function types, the name of the Java method that implements the rule's logic |
| instanceQuery | LargeString | | | For METALANG function types, the query to obtain object instances of the appropriate subject type (i.e, MetaClasses and/or MetaCollections). |

One of either the 'functionName' or the 'instanceQuery' attributes should be defined depending on the value of the 'functionType' attribute (i.e., 'functionName' for JAVA function types and 'instanceQuery' for METALANG function types).

Validation Rule Design

An example of a design pattern used to implement validation rules according to one embodiment is as follows:

```
public static boolean < Rule Name > (
    BusinessObject obj, SubjectType type, String ruleID, List errors)
{
    < Prologue >
    int status = < Succeeded >;
    try {
        < Implementation of the Validation Rule >
        if (status = = < Failure >)
            errors.add( new ValidationError(obj, type, ruleID,
                                < Message Substitutions >) );
    catch (Exception e) {
        throw new IPRuntimeException(< Error Key >, e);
    }
    < Epilogue >
    return ( status = = < Succeeded > );
}
```

In one aspect, the actual implementation of a rule is performed using a client, e.g., client 12.

A validation rule enforces a single criteria on its subject. Executing a validation rule, in effect, enforces the criteria on that subject. Validation rules are preferably grouped according to their associated subject (i.e., all collection rules applied to a specific subject are grouped in a file (e.g., Java file) strictly devoted to containing collection rules that are to be applied on that subject).

Each validation rule preferably has a single error message associated with it that is to be displayed in the event that the rule fails. This message may or may not have substitution parameters associated with it. In one aspect, each error message is identified using a unique key (e.g., as shown by the '<Error Key>' above).

In one aspect, each validation rule takes, as input parameters from the validation engine 40, the following objects:

BusinessObject—The object instance of the subject that the validation rule is being applied to.

SubjectType—The type of subject being supplied to the validation rule.

String—The Id of the ValidationRule that is being applied on the subject (i.e., the instance of the subject).

List—A running list of validation errors that have occurred during the validation process.

The BusinessObject is used by a client when implementing the body of the validation rule. The SubjectType is used to determine the type of the subject as well as what kind of validation rule is being executed (e.g., an Attribute rule when the type of the subject is a MetaAttribute). The List is supplied so that the validation engine 40 is able to accumulate all validation errors that occur during the validation process. For each error, a new ValidationError object is added to this list. The Id of the ValidationRule, in addition to the other parameters, is used when creating a new instance of a ValidationError should the rule fail. When needed, a BLL API is called to retrieve the actual ValidationRule associated with the ruleId.

The 'Prologue' portion of each validation rule logs information about the subject and the rule using the Diagnostic Service for tracing/debugging purposes. Parameters are checked for null and any local parameters common to all rules are also declared and initialized during this prologue (e.g., the error message substitutions array).

The 'Implementation' of the rule is written by a client. Each rule is different so the execution of each rule will vary based on the criteria that the rule is trying to enforce. The implementation uses the BLL to access data stored in the database 90 about the subject and any associated objects that are needed in order to execute the rule. Part of the job of the client when writing the rule is to set the status of the rule and also provide the necessary message substitutions (if any) in the event that the rule fails.

The 'Epilogue' portion of each validation rule logs information about the rule and the status of that rule after it has executed using the Diagnostic Service (e.g., whether or not the rule succeeded or failed for the given subject) for tracing/debugging purposes.

The output of each validation rule is preferably a boolean flag that indicates whether or not the rule succeeded (i.e., 'true') or failed (i.e., 'false'). In the event that the rule fails, a new ValidationError object describing that failure is added to the running list of ValidationError objects. If an unexpected exception occurs during the execution of a rule, an exception is thrown.

Validation Query Design

An example of a design pattern for validation queries (implemented in Java) according to one embodiment is as follows:

```
public static List < From Object >TO< To Object > (BusinessObject bo)
{
    if (bo = = null)
        throw new IPRuntimeException
            ( < Error Key >, new IllegalArgumentException( ) );
    List list = new ArrayList( );
    < Add all 'To Object' instances reachable from the 'From Object' >
    return list;
}
```

Queries are implemented based on the underlying model and are typically written by developers. Queries are used by the validation engine 40 to help produce a transitive closure (i.e., a complete set of deployable objects) based on the 'From Object' acting as the 'root' object. As described herein, the queries are used in conjunction with a separate process (algorithm) that, with the combined results, produce the transitive closure (or 'deployable unit').

The input to the (Java) query is a BusinessObject instance (e.g., the 'root' object of the deployment unit). A query traverses all associations from the 'From Object' to the 'To Object' and proceeding through any and all intermediate objects (e.g., intersection objects). The implementation of each query varies and depends on the starting 'From Object' and to which 'To Object' the query must traverse. Some queries may be more straightforward than others, and can be much more complicated depending on the underlying model and the relationship between the 'From Object' and the 'To Object.' The set of objects produced by each query is a subset of the overall deployment unit. These subsets are combined (with the results of a separate algorithm) to form a complete deployment unit.

Each query returns a List of all 'To Object' instances that are reachable from the 'From Object' by traversing all associations through the model starting from that 'From Object'. If the 'From Object' is null upon entering a query, an exception is thrown.

Validation Seed Task Design

The Validation Seed Task module 70 is responsible for seeding all of the validation metadata that is not already pre-seeded during the model generation process. During model generations some of the validation metadata is pre-seeded. The Validation Seed Task module 70 seeds all ValidationRules 120, SubjectTypes 110, SubjectTypeMembers 140 and the various associations between these objects.

The Validation Seed Task 70 is incorporated into a standard System Seed Driver, and has no inputs. During validation seed task processing, an API, e.g., ValidationSeedTask.doWork( ) API, is invoked by the SystemSeedDriver. Using the BLL 50, all validation metadata not already pre-seeded by the model generation process is seeded. SubjectTypes, including all Aggregated and non-Aggregated MetaCollections are seeded. All Attribute, AssociationEnd, Object and MetaCollection rules are also created and associated with their respective SubjectType. Each SubjectTypeMember 140 is also created and associated with a SubjectType 110 accordingly.

According to one aspect, an example of a pattern for creating all Deployable MetaCollections is as follows:

```
SubjectType st = (SubjectType)
    getObject(SubjectType.class, < Name of MetaCollection's
    MetaClass >);
        e.g. getObject(SubjectType.class, "TIP_BusinessProcess")
SubjectType metaCollection =
    createMetaCollection(<MetaCollection Name>, <Description>, st);
        e.g. DeployableBusinessProcessMC =
            createMetaCollection
                ("DeployableBusinessProcess",
                "A complete Business Process deployable
                unit", st)
putObject(SubjectType.class,
            <MetaCollection Name>, <MetaCollection SubjectType>);
    e.g. putObject(SubjectType.class,
            "DeployableBusinessProcess",
DeployableBusinessProcessMC)
```

The 'createMetaCollection' API creates the MetaCollection SubjectType of type 'DEPLOYABLECOLLECTION' and associates the SubjectType representing the MetaClass of that MetaCollection (i.e., the SubjectType instance, 'st' which has already been seeded). A Deployable MetaCollection SubjectType must first be created before any rules can be associated with it. Note that the name of Deployable MetaCollections must match the String in the MetaCollectionContants.java file which contains the names of all Deployable Collections (e.g., MetaCollectionConstants.DeployableBusinessProcess in this case). For Aggregated MetaCollections, the name must be the same as the pre-seeded SubjectType name for that Aggregated MetaCollection. In one aspect, aggregated MetaCollection SubjectTypes are created for each First Class object in the object model, and the name of each Aggregated MetaCollection is the name of the MetaClass representing that First Class object.

According to one aspect, an example of a pattern for creating a validation rule on a SubjectType is as follows

```
SubjectType st = (SubjectType)
    getObject(SubjectType.class, < Name of the SubjectType >);
        e.g. getObject(SubjectType.class,
        "TIP_BusinessProcess.name")
createRule
    (st, <Rule Number>, <Error Key>, <Function Name>,
    <Enforcement Type>);
        e.g. createRule
            (st, "ruleATTR1_1", "DVR_ATTR1_1",
"oracle.tip.buslogic.validation.rules.AttributeRules::ruleATTR1_1",
            EnforcementType.CORRECTNESS);
```

The input parameters include Rule Number, Error Key, Function Name and Enforcement Type. The rule's name is the name of the rule that is derived from a combination of the SubjectType name and the rule number, e.g., "TIP_BusinessProcess.name::ruleATTR1_1". Rule Number is the unique number of the rule. Error Key is the key of the entry in the resource bundle that contains the error message associated with this rule. Note that the prefix for the validation error message bundle is "DVR" in this example. Function Name is the fully qualified name of the (Java) function that implements this rule, e.g., "oracle.tip.buslogic.validation.rules.AttributeRules::ruleATTR1_1". AttributeRules.java is the Java file that contains the method "ruleATTR1_1". Enforcement Type is the type of the rule (i.e. CORRECTNESS or COMPLETENESS).

In the example above, a rule called "TIP_BusinessProcess.name::ruleATTR1_1" is applied to the "name" attribute of a BusinessProcess (i.e., the SubjectType instance, 'st' which has already been seeded). The method called "ruleATTR1_1" implements this rule and is located in a file called "AttributeRules.java" in a "oracle.tip.buslogic.validation.rules" package.

The 'createRule' API logs information about the rule being created using the Diagnostic Service.

Creating SubjectTypeMembers makes the association between two SubjectTypes and defines the necessary query function that will be executed starting from a 'From Object' and proceeding to a 'To Object'. According to one aspect, an example of a pattern for creating SubjectTypeMembers and making the necessary SubjectType association is as follows (where 'Type' is either 'MetaCollection' or 'MetaClass'.):

```
create< Type >Member
    (<From Object>, <To Object>,
        <Name of the SubjectTypeMember>, <FunctionType>,
        <Function Name>);
```

The input parameters include From Object, To Object, Name, FunctionType and Function Name. From Object is the SubjectType of the 'From Object' in the query, To Object is the SubjectType of the 'To Object' in the query, Name is the name of the SubjectTypeMember, FunctionType is the type of the query that will be executed (i.e., either JAVA or METALANG), and Function Name is the name of the query that will be executed.

For MetaCollection SubjectTypeMembers, the 'From Object' is the 'parent' SubjectType in the UML diagram (FIG. 3) while the 'ToObject' is the 'child' SubjectType. For MetaClass SubjectTypeMembers, the 'To Object' is the 'metaClass' SubjectType.

According to one aspect, an example of creating a MetaCollection SubjectTypeMember is as follows:

```
createMetaCollectionMember
    (DeployableBusinessProcessMC, IPAgreementMC,
    "oracle.tip.buslogic.validation.rules.MemberQueries::DeployableBusinessProcessTOIPAgreement",
        FunctionType.JAVA,
    "oracle.tip.buslogic.validation.rules.MemberQueries::DeployableBusinessProcessTOIPAgreement")
```

As shown in this example, a new SubjectTypeMember, creating the association between a DeployableBusinessProcess MetaCollection and an IPAgreement MetaCollection, is created. It is assumed that both MetaCollections have already been created as per the above description. The query that will be executed is a Java function located in the "MemberQueries.java" file found in the "oracle.tip.buslogic.validation.rules" package. The name of the function is "DeployableBusinessProcessTOIPAgreement". This query produces a List of all IPAgreements reachable from a BusinessProcess. The name of the SubjectTypeMember should follow the same pattern (i.e., in this case its simply the same as the function name).

The 'From Object' should always be a MetaCollection. The 'To Object' could be either a MetaCollection or it could be an object represented by a MetaClass. An example of a pattern for creating SubjectTypeMembers is slightly different in this case:

```
SubjectType st = (SubjectType)
    getObject(SubjectType.class, <Name of the object's MetaClass>);
        e.g. getObject(SubjectType.class, "TIP_Actor")
```

The 'To Object' SubjectType must first be retrieved before creating the new SubjectTypeMember. The SubjectTypeMember can now be created, making the association between the two SubjectTypes. For example:

```
createMetaClassMember
    (SupportedActorMC, st,
    "oracle.tip.buslogic.validation.rules.MemberQueries::SupportedActorTOActor"
    ,
        FunctionType.METALANG,
        "self.Actor");
```

Here, the 'From Object' is the 'SupportedActor' MetaCollection. The 'To Object' is 'Actor' (represented by the SubjectType whose MetaClass name is the name of the MetaClass for Actor, "TIP_Actor"). The name of the query follows the same pattern as above. In this example, however, the query is expressed using METALANG. The association from SupportedActor to Actor is traversed by executing the getActor( ) API on the SupportedActor object instance. In the query example shown, "self" refers to an instance of SupportedActor. The ".Actor" part refers to the name of the association between SupportedActor and the object to which it is connected, which, in this case is an instance of Actor. The ".Actor" translates to a call to the BLL 50 getActor( ) API of SupportedActor.

Both 'create<Type>Member' APIs used for creating SubjectTypeMembers will log information about the new SubjectTypeMember using the Diagnostic Service.

The Validation Seed Task 70 populates the SubjectType table (in database 90) with all SubjectTypes. It also populates the ValidationRule table (in database 90) with all validation rules in addition to making the appropriate association to their respective SubjectType. The SubjectTypeMember table (in database 90) is also populated with both MetaCollection and MetaClass members. For MetaCollection SubjectTypeMembers, the parent/child associations are made. Compare that with MetaClass SubjectTypeMembers whose metaClass association is made instead.

Design Time

To compute a set of objects to be validated during design time, various APIs are provided. Examples of such APIs include the following:

public Set getBusinessObjects(BusinessObject object, SubjectType metaCollection)—This API returns the set of all objects associated with the specified BusinessObject for the given MetaCollection that form a collection public Set getBusinessObjects(BusinessObject object, String metaCollectionName) throws ObjectNotFoundException—This API performs the same function as the above API except that the actual name of the MetaCollection is given instead of the MetaCollection itself.

public Set getDeployableBusinessObjects(BusinessProcess BP)—This API returns the set of all objects associated with the specified BusinessProcess, hence forming a complete configuration that can then be deployed.

In one aspect, only those objects with an appropriate lifecycle state are included in the resulting Set. The lifecycle state should be taken into account to ensure that only those applicable objects that are in an approved state are included for profile metadata. U.S. patent application Ser. No. 10/734,860, now U.S. Pat. No. 7,457,817 entitled "Versioning in an Integration Platform", and U.S. patent application Ser. No. 10/735,217, now U.S. Pat. No. 7,209,933 entitled "Object Versioning", all filed on even date herewith, the contents of which are each hereby incorporated by reference in its entirety, teach aspects of lifecycle management lifecycle state, and versioning.

In one aspect, the following API is provided to allow the UI to determine a default MetaCollection in cases where there may be more than one collection associated with that object:

public SubjectType getDefaultCollectionMetaCollection (MetaClass metaClass)throws ObjectNotFoundException—This API returns a default collection in cases where there are more than one collection associated with the given MetaClass.

The above API never returns null. If no such default MetaCollection exists, the ObjectNotFoundException is thrown instead.

Two types of validation are provided in the presentation layer (UI) 20, object and collection. In one aspect, object validation occurs either implicitly by the BLL 50 whenever an object is first created or updated (correctness only), or explicitly by the UI when an object is loaded and viewed on a details page (correctness and completeness). When performing object validation, the scope of that validation is the object being validated and all of its strongly aggregated objects recursively. In one aspect, collection validation occurs when a user explicitly clicks on a special 'Validate' button. The scope of this type of validation is the true transitive closure of all objects starting from the given root object.

A root object and all of its strong aggregated objects recursively is referred to as an Aggregated Collection. This advantageously improves performance (e.g., the performance of (deployable) collection validation may be unacceptable for UI purposes because the size of the transitive closure can often times be prohibitively large).

The 'Validate' functionality for a specified object may have a problem which can occur when an object has more than one MetaCollection (or Deployable Collection) associated with it. In one aspect, the object's Default Collection is chosen in cases like these to make it easier for the UI to know which to use when performing the 'Validate'.

In the above APIs, a set is used to capture all of the objects as opposed to a list. This guarantees uniqueness of all objects within the set (i.e., no object will be included in the set more than once). It is possible that more than one MetaCollection could contain a given object. By using a set, the same object will not be included multiple times. The order of the objects returned is irrelevant and need not be preserved.

To allow the UI to perform object validation the following API is provided:

ModelValidationResult validateObject (BusinessObject businessObject, int enforcementType, int validationLevel)

In this API, validation of a (root) object will also include validation of all objects that are strongly aggregated with that object recursively. Enforcement type refers to an indication to the validation engine 40 that determines which type of validation is to be performed as shown in Table 11. Validation level refers to an indication to the validation engine regarding which validations are to be performed (i.e., attribute, association, object, etc., or some combination of these) as shown in Table 12

TABLE 11

| Enforcement Type | |
| --- | --- |
| CORRECTNESS_ENFORCEMENT | Execute correctness validation rules only |
| COMPLETENESS_ENFORCEMENT | Execute completeness validation rules only |
| FULL_ENFORCEMENT | Execute both correctness and completeness validation rules |

TABLE 12

| Validation Level | |
| --- | --- |
| ATTRIBUTE_LEVEL | Execute all validation rules associated at the attribute level |
| ASSOCIATION_LEVEL | Execute all validation rules associated at the association level |
| OBJECT_LEVEL | Execute all validation rules associated at the object level |
| ALL_OBJECT_LEVEL | Execute all validation rules associated at the attribute, association and object levels of the aggregated collection |
| COLLECTION_LEVEL | Execute all validation rules associated at the collection level |

Generally, COLLECTION_LEVEL is preferably only used when validating MetaCollections. In one aspect, object validation occurs in BLL 50 when an object is first created or updated. In this aspect, the UI 20 and the BLL 50 use ALL_OBJECT_LEVEL which includes aggregation. In the UI 20, this also occurs when an object is loaded for display on a details page.

The return type, in one aspect, is a Java class that contains information regarding the success or failure of the validation, a list of errors that were encountered (if any) and a set of all objects traversed during the validation process.

Prior to deployment, the configuration manager 25 creates a new configuration when a user selects a business process for which a configuration is to be created and deployed. In one aspect, the configuration manager 25 invokes the following API:

public Set getDeployableBusinessObjects(BusinessProcess BP)

The configuration manager 25 uses this API to retrieve the set of objects in the deployment unit. It then invokes the following API to validate the objects in that set:

public ModelValidationResult validateDeployableBusinessObjects (Set deployable Unit, int enforcementType)

Once the deployment unit has been successfully validated, the configuration manager 25 then creates a configuration that contains all of the objects in the set returned by the first API above.

The UI layer 20, in one aspect, calls one of the following APIs to validate a collection (for example, when a user explicitly requests validation, e.g., by selecting a 'Validate' button):

ModelValidationResult validateCollection
        (BusinessObject businessObject, SubjectType metaCollection, int enforcementType)
    ModelValidationResult validateCollection (BusinessObject businessObject, String metaCollectionName, int enforcementType) throws ObjectNotFoundException, The APIs which accept a String (e.g., name) instead of an actual object represented by that String are included as wrappers for simplicity in cases where only the name of the corresponding object is known. This avoids having the user determine and retrieve the object. In the above APIs, the ObjectNotFoundException will generally occur when a corresponding object is not found given the specified name for that object.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of validating metadata for an object model stored in a database, comprising:
    identifying a first subject of validation, wherein the first subject is one of an object, an attribute, an association and a collection of objects;
    determining a context of metadata validation based on the first subject, the context including one of a) the first subject, and b) the first subject and one or more additional subjects;
    querying the database to retrieve a set of objects requiring validation, the set of objects determined by the first subject of validation and the determined context;
    querying the database to retrieve one or more validation rules for each object in the set of objects, the one or more validation rules stored independently from the set of objects requiring validation, wherein the one or more validation rules retrieved from the database is based on the context of metadata validation, wherein retrieving the one or more validation rules includes identifying rules in rule files based on the subject type of each subject to be validated; and
    applying the validation rules to each object in the set of objects,
    wherein applying the validation rules results in one of partially and completely validating the metadata for the object model, a partial validating of the object model allowing an existing portion of the metadata to be validated before all metadata for the object model is determined, and occurs prior to deployment of the object model, a deployment of the object model allowing the object model to be used to store data according to the object model.

2. The method of claim 1, wherein each subject is a metadata object selected from the group consisting of a MetaAttribute, a MetaAssociation, a MetaAssociationEnd, a MetaClass and a MetaCollection.

3. The method of claim 1, wherein identifying includes receiving an indication from a user interface module, said indication identifying the first subject.

4. The method of claim 1, wherein identifying includes receiving an indication from a configuration management module, said indication identifying the first subject.

5. The method of claim 1, wherein identifying includes receiving an update indication identifying the first subject in response to a modification of the first subject.

6. The method of claim 1, wherein each of the one or more validation rules is one of a correctness type rule and a completeness type rule, a correctness validation rule operable to be applied while partially validating the object model and a completeness validation rule operable to be applied while completely validating the object model.

7. The method of claim 1, wherein the first subject is a root object for a collection of associated objects.

8. The method of claim 7, wherein the collection of objects is a deployable collection including all objects transitively associated with the root object.

9. The method of claim 7, wherein the collection of objects is an aggregated collection including the root object and all of its strongly aggregated child objects recursively.

10. The method of claim 1, wherein determining a context includes:
    a) traversing all associations with a root object to identify target objects;
    b) repeating a) for each target object, with each target object as the root object; and
    c) generating a list of all target objects, wherein said list of objects represents a transitive closure based on the root object.

11. The method of claim 10, wherein determining a context is implemented using queries written in the Java language or a meta-language (METALANG) or both.

12. The method of claim 10, wherein the list of objects forms the context for validation.

13. The method of claim 10, wherein the first subject is the root object.

14. The method of claim 1, wherein each rule file is a Java file.

15. The method of claim 1, wherein each subject in the context is one of an instance of an object, an instance of an object containing an attribute, an instance of an object having an association and an instance of root object of a deployable unit of a collection of objects.

16. A metadata validation system for validating an object model, comprising:
a processor;
a database that stores objects and metadata of the object model;
means for identifying a first subject of validation, wherein the first subject type is one of an object, an attribute, an association and a collection of objects;
means for determining a context of metadata validation based on the first subject, the context including one of a) the first subject, and b) the first subject and one or more additional subjects;
means for querying the database to retrieve a set of objects requiring validation, the set of objects determined by the first subject of validation and the determined context;
means for querying the database to retrieve one or more validation rules for each object in the set of objects, the one or more validation rules stored independently from the set of objects requiring validation, wherein the one or more validation rules retrieved from the database is based on the context of metadata validation, wherein retrieving the one or more validation rules includes identifying rules in rule files based on the subject type of each subject to be validated; and
applying the validation rules to each object in the set of objects with a computer,
wherein applying the validation rules with the computer provides for both partially and completely validating the metadata for the object model, a partial validating of the object model allowing an existing portion of the metadata to be validated before all metadata for the object model is determined, and provides for the validation occurring prior to deployment of the object model, a deployment of the object model allowing the object model to be used to store data according to the object model.

17. The system of claim 16, wherein each subject is a metadata object selected from the group consisting of a MetaAttribute, a MetaAssociation, a MetaAssociationEnd, a MetaClass and a MetaCollection.

18. A computer-implemented method of validating metadata in an object model in a database, the method comprising:
receiving user defined rules, each rule defining a validation rule on a metadata object, each rule being one of a completeness type rule and a correctness type rule;
storing the validation rules to the database;
identifying a first subject of metadata validation, wherein the first subject has a subject type selected from the group consisting of an attribute, an association, an object and a collection of objects;
determining a context of validation based on the first subject, wherein the context includes the first subject and none, one or more additional subjects;
querying the database to retrieve a set of objects requiring validation, the set of objects determined by the first subject of validation and the determined context;
querying the database to retrieve one or more validation rules for each object in the set of objects, the one or more validation rules stored independently from the set of objects requiring validation, wherein the one or more validation rules retrieved from the database is based on the context of validation, wherein retrieving the one or more validation rules includes identifying rules in rule files based on the subject type of each subject to be validated;
receiving a selection from the user of a type of validation to perform, the type selected from the group consisting of correctness and completeness;
applying a correctness type validation rule to each object in the set of objects when the selection indicates correctness type validation; and
applying a correctness type and a completeness type validation rule to each object in the set of objects when the selection indicates completeness type validation, wherein applying the correctness type or the completeness type validation rule occurs prior to deployment of the object model, a deployment of the object model allowing the object model to be used to store data according to the object model.

19. The method of claim 18, wherein each subject is a metadata object selected from the group consisting of a MetaAttribute, a MetaAssociation, a MetaAssociationEnd, a MetaClass and a MetaCollection.

20. The method of claim 18, wherein identifying a first subject includes receiving an indication from one of a user interface module and a configuration management module, the indication identifying an instance of an object in the database.

21. The method of claim 18, wherein the first subject is a root object for a collection of associated objects.

22. The method of claim 21, wherein the collection of objects is one of a deployable collection including all objects transitively associated with the root object and an aggregated collection including the root object and its child objects, wherein the child objects are objects that are strongly aggregated to the root object recursively.

23. The method of claim 21, wherein determining a context includes:
a) traversing all associations with the root object to identify target objects;
b) repeating a) for each target object, with each target object as the root object; and
c) generating a list of all target objects, wherein said list of objects represents a transitive closure based on the root object.

24. The method of claim 18, wherein storing the validation rules to the database includes:
storing metadata describing the validation rules to the database; and
storing the validation rules to one or more Java files.

25. A computer readable storage medium containing a set of instructions that when executed by a processor cause the processor to validate metadata in an object model in a database, the set of instructions causing the processor to perform the steps of:
receiving user defined rules, each rule defining a validation rule on a metadata object, each rule being one of a completeness type rule and a correctness type rule;
storing the validation rules to the database;
identifying a first subject of metadata validation, wherein the first subject has a subject type selected from the group consisting of an attribute, an association, an object and a collection of objects;
determining a context of validation based on the first subject, wherein the context includes the first subject and none, one or more additional subjects;
querying the database to retrieve a set of objects requiring validation, the set of objects determined by the first subject of validation and the determined context;

querying the database to retrieve one or more validation rules for each object in the set of objects, the one or more validation rules stored independently from the set of objects requiring validation, wherein the one or more validation rules retrieved from the database is based on the context of validation, wherein retrieving the one or more validation rules includes identifying rules in rule files based on the subject type of each subject to be validated;

receiving a selection from the user of a type of validation to perform, the type selected from the group consisting of correctness and completeness;

applying a correctness type validation rule to each object in the set of objects when the selection indicates correctness type validation; and applying a correctness type and a completeness type validation rule to each object in the set of objects when the selection indicates completeness type validation, wherein applying the correctness type or the completeness type validation rule occurs prior to deployment of the object model, a deployment of the object model allowing the object model to be used to store data according to the object model.

* * * * *

UNITED STATES PATENT AND TRADEMARK OFFICE
CERTIFICATE OF CORRECTION

PATENT NO. : 7,865,480 B2
APPLICATION NO. : 10/731805
DATED : January 4, 2011
INVENTOR(S) : Christoph Bussler et al.

Page 1 of 1

It is certified that error appears in the above-identified patent and that said Letters Patent is hereby corrected as shown below:

On the title page, item (54), in column 1, in "Title", line 2, delete "OBJECTS" and insert -- OBJECT --, therefor.

On the title page, item (75), in column 1, in "Inventors", line 2, delete "Krishnawamy" and insert -- Krishnaswamy --, therefor.

On the title page, item (56), in column 2, under "Other Publications", line 10, delete "Heyningl," and insert -- Heyning, --, therefor.

On the title page, item (56), in column 2, under "Other Publications", line 11, delete "knowlege" and insert -- knowledge --, therefor.

In column 1, line 2, delete "OBJECTS" and insert -- OBJECT --, therefor.

In column 6, line 15, delete "UT" and insert -- UI --, therefor.

In column 20, line 40, delete "12" and insert -- 12. --, therefor.

Signed and Sealed this
Twentieth Day of September, 2011

David J. Kappos
*Director of the United States Patent and Trademark Office*